Oct. 11, 1960     D. J. KRAHN     2,955,571
ANIMAL LEG RESTRAINER
Filed Oct. 6, 1959
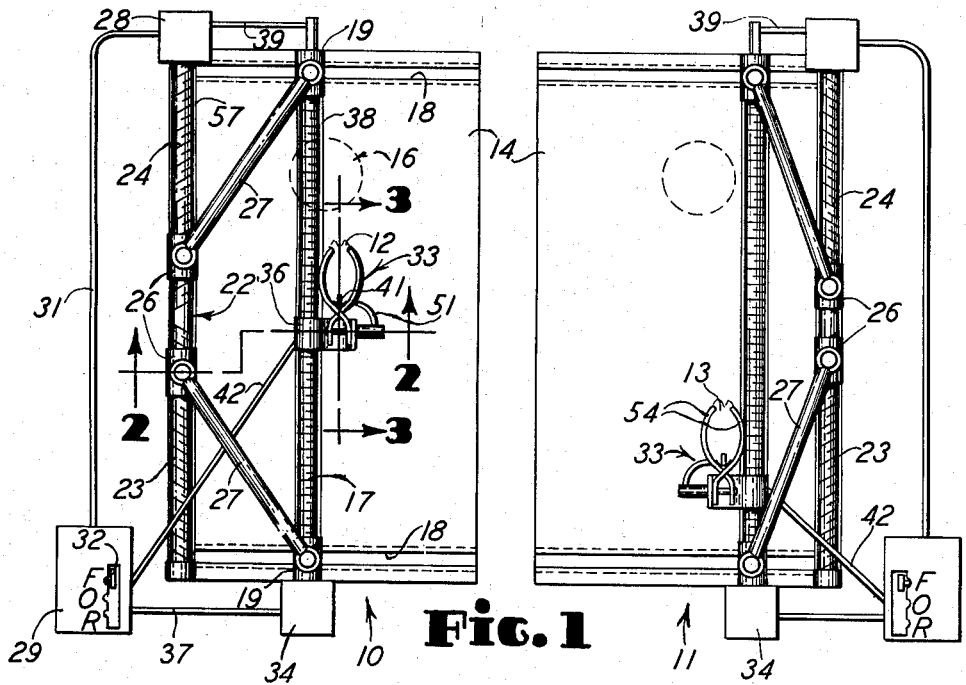
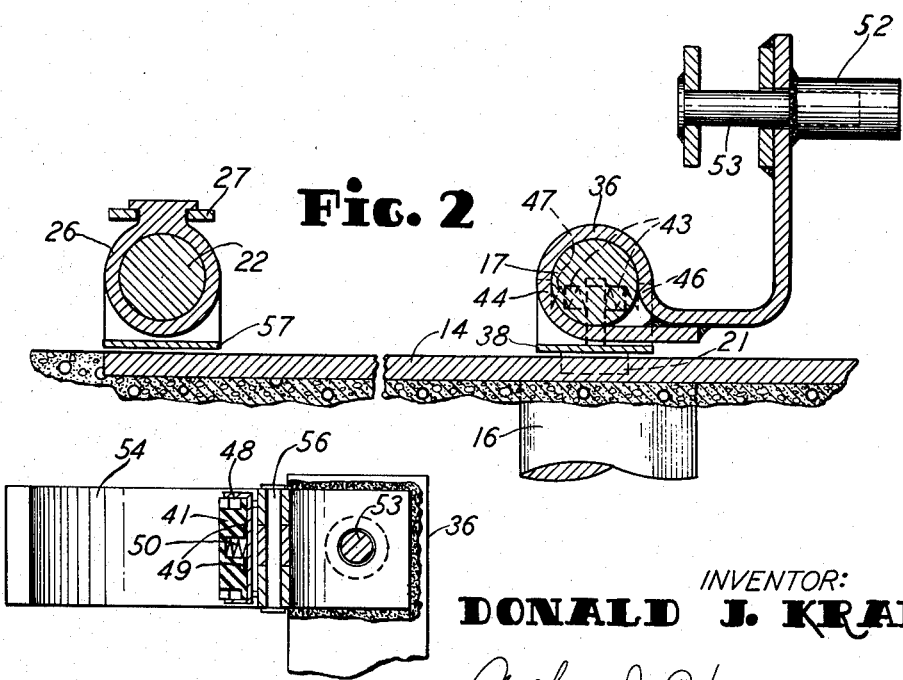
INVENTOR:
DONALD J. KRAHN
BY: *Arthur J. Hansemann*
ATTORNEY //
United States Patent Office 2,955,571
Patented Oct. 11, 1960

2,955,571

ANIMAL LEG RESTRAINER

Donald J. Krahn, Rte. 1, Box 675, Salem, Wis.

Filed Oct. 6, 1959, Ser. No. 844,736

6 Claims. (Cl. 119—128)

This invention relates to an animal leg restrainer, and, more particularly, it relates to a leg restrainer which is preferably automatically operable whereby a cow or the like can be placed in position adjacent the device and the actuation of a switch will commence the operation of the device to automatically grasp and restrain the leg of an animal.

It is an object of this invention to provide an animal leg restrainer which operates automatically to hold the leg of an animal, such as a cow which is to be milked.

Another object of this invention is to provide an animal leg restrainer which is simple, but yet reliable in its operation, and which is completely safe for both the operator and the animal.

Still another object of this invention is to provide a leg restrainer for cows whereby it is safe to approach the cow and milk the cow without the danger of being kicked by the cow, and whereby it is easier to attach the necessary milking machinery to the cow.

Other objects and advantages will become apparent upon reading the following description in light of the accompanying drawings, wherein:

Fig. 1 is a top plan view of a preferred embodiment of this invention.

Fig. 2 is an enlarged sectional view taken along the lines 2—2 of Fig. 1 and having parts broken away.

Fig. 3 is an enlarged sectional view taken along the lines 3—3 of Fig. 1.

The same reference numerals refer to the same parts throughout the several views.

The drawings show a restraining device generally designated 10 for holding the left hind leg of a cow and a restraining device generally designated 11 for holding the right hind leg of a cow. These legs are also indicated at 12 and 13 respectively. Thus, since the device or apparatus is duplicated on the opposite side for grasping and restraining the respective left and right hind legs of a cow or the like, the following description is directed at describing either device 10 or 11. It will thus be noticed that a platform 14 is shown mounted on a post or column 16 which can be raised or lowered in any conventional manner for raising and lowering the platform 14. Thus, after the animal or cow is held as indicated in Fig. 1 by clamping the legs 12 and 13, the platform 14 can be raised to a more convenient level for the purpose of attaching the machinery for milking the cow, for instance. Of course it will be understood that the cow's front legs are raised a similar distance so that the cow remains on a level when raised or lowered.

A clamp holder 17 is shown disposed above the platform 14 and is movable thereover and can be guided therealong in a track 18 at each end of the holder 17. Thus, support members 19 on the opposite end of the holder 17 can be provided with a depending projection 21, which simply is engaged in the recessed track 18 for sliding therealong and retaining the holder 17 with respect to the platform 14 in any conventional manner. The holder 17 is movable over the platform 14 by means of a screw 22 which is threaded in one direction at the end 23 and is threaded in an opposite direction at the end 24, so that upon rotation of the screw 22, nuts 26 which are threadedly engaged with the respective ends 23 and 24 will be displaced axially of the screw 22. Also, links 27 are attached to the nuts 26 at one end of the link while the opposite end of the link attaches to the supports 19. It should thus be apparent that when the screw 22 is rotated, the nuts 26 will move along the screw in opposite directions so that the nuts can assume the position shown in either the left side of Fig. 1 or the position shown in the right side of Fig. 1.

Also, a powered means or motor 28 is shown on one end of the screw 22 for the purpose of rotating the latter when the motor 28 is energized through a master control box 29 and the electrical connection of a cable 31 or the like. At this time it will also be noticed that the control 29 has a switch 32 which can be placed in a forward, off, or reverse position on the control 29 for the desired functions which will be hereinafter apparent.

It will also be seen that a leg clamp, generally designated 33 is movably mounted on the holder 17 to move therealong. Further, notice that a powered means or motor 34 is connected to one end of the holder 17 for the purpose of rotating the latter and inducing the movement to the clamp 33 as the holder 17 is povided with the external threads shown and it will be understood that the clamp bracket 36 is provided with internal threads. Thus, upon rotation of the holder 17 by the motor 34, the clamp 33 is displaced axially of the holder 17. An electric cable 37 extends from the control box 29 to the motor 34. It will, of course, also be apparent that an automatic windup reel can be provided in either the box 29 or the motor 34 to have the cable 37 remain taut as shown, but yet, of course, permit the motor 34 to be displaced along the platform 14 as desired. At this point, the operation of the device as described thus far, is such that upon placing the switch 32 in the forward position, the motor 28 is energized to rotate the reversely threaded screw 22 and thereby move the nuts 26 in the opposite directions along the screw 22, to displace the holder 17 away from the screw 22. When the screw or holder 17 approaches the animal's leg 12, a pressure-sensitive bar 38 engages the animal's leg or hoof to be offset against a spring return and to thereby close electrical contact points and to relay this fact through the cable or wire 39 and thus electrically disconnect the motor 28 to stop the latter and thereby stop the displacement of the holder 17. Also, this switch action automatically energizes the motor 34 through the conventional switch action in the control box 29 to thereby rotate the threaded holder 17 and thus move the clamp 33 along the holder 17 until the clamp engages the leg 12. When this occurs, a pressure-sensitive bar or switch 41, which contacts the leg 12, closes electrical contact points and relays this fact through the cable 42 back to the control box 29 which stops the motor 34 and simultaneously causes the jaws of the clamp 33 to close on the leg 12 to assume the position shown in the drawing in Fig. 1.

Fig. 2 shows an embodiment of a switching mechanism connected with the pressure bar 38, and this mechanism is shown to consist of a projection or contact point 43 extending to the opposite side of the bar 38 and housed in the bearing 19 adjacent the wire 39. Cooperating contacts are located at projections 44 and 46 which are also in the upper bearing or support member 19 and compression coil springs 47 are disposed between the contacts 43 and the stationary contacts 44 and 46 such that when the bar 38 is offset to either side, the contacts are made and the electrical circuit is completed and as soon as the pressure on the bar 38 is relieved, the springs 47 return the bar 38 to the position shown in Fig. 2. Also, Fig. 3 shows the embodiment of a connection on the clamp 33 and here the insulated pressure bar 41 is shown slidably mounted in a holder 48 which permits the bar 41 to be displaced from the extreme rearward position shown to a slightly forward position out of contact with the back of the bracket 48. Thus, an electrical contact 49 is on the bar 41 to make contact with the bracket 48 when the bar 41 is depressed to the Fig. 3 position, and this closes the electrical circuit and such is effective through the wire 51 which is connected to a solenoid housing 52. By this connection the solenoid is energized so that its plunger 53 is drawn further into the housing 52 to draw the clamp jaws 54 together into the position shown in Fig. 1. Of course, a hinge pin 56 can be provided between the opposite ends of the clamp 33 so that the latter can have the necessary scissors action to perform the function described. The electrical contact 49 on the pressure bar 41 is also connected to the cable 42 as indicated in Fig. 1 so that the closed contact 49 will relay the necessary information back to the control 29 for the purpose of stopping the motor 34 as described.

Also a pressure bar 57 is mounted below the screw 22 and is operable on an automatic switch with spring return in the manner described in connection with the pressure bar 38. Thus, in the event the cow's foot or hoof is placed between the bar 57 and the link 27 and the latter is pressing the hoof therebetween, the switch 57 will automatically stop the mechanism without injury to the cow.

With the device as thus described, the cow can be directed onto the platforms 14 and the switches 32 can be placed in the forward position so that the screws 22 will commence rotation under the power of the motors 28. This displaces the holders 17 toward the hoofs of the cow so that when the pressure bars 38 are offset to close their respective electrical contacts and this condition is relayed through the automatically rewound wires or cable 39 back to the motors 28 and the control box 29, the motors 28 are shut off and the motors 34 are automatically started. This displaces the clamps 33 along the holder 17 so that the latter can engage the legs 12 and 13 as shown in Fig. 1. Of course, when the pressure bars 41 do contact the backs of legs 12 and 13, the contacts 49 are closed and this condition is relayed through the wires 42 to the control box 29 and this stops the motors 34, and it also energizes the solenoid 52 to close the clamp jaws 54 onto the legs 12 and 13. Also, placing the switches 32 in the "reverse" position causes the clamps 33 to open and automatically causes the clamp 33 to be retracted along the holder 17 as the motors 34 rotate the holder 17 and the automatic windup reels within the control 29 take in the cables 42 in a very well-known and conventional manner. The reversing action also causes the holder 17 to be displaced toward the screws 22 as the latter is rotated by the motors 28 for the reverse of the action described in connection with these parts. There is a spring pin 50 disposed between the bar 41 and the bracket 48 to urge the contacts 49 out of contact with the bracket 48 when the animal's leg is not pressing the bar 41.

While a specific embodiment of this invention has been shown and described, it should be obvious that certain changes could be made in the embodiment, and the invention should, therefore, be limited only by the scope of the appended claims.

What is claimed is.

1. An automatically operable device for restraining the legs of an animal, comprising a leg clamp holder disposed in a floor plane for lateral movement in said plane, first powered means connected to said holder for moving the latter, control means connected to the said first powered means for energizing the latter, a leg clamp mounted on said holder for movement thereon in a direction angled to said lateral movement, second powered means connected to said leg clamp for moving the latter, clamp operating mans connected to said leg clamp for opennig and closing the latter, and pressure sensitive controls on said holder and said clamp operating means for alternate automatic operation of both said powered means in response to respectively contacting the leg of an animal.

2. An automatically operable device for restraining the legs of an animal, comprising a leg clamp holder movable in a first direction, first powered means connected to said holder for moving the latter, first control means connected to said first powered means for energizing the latter, a leg clamp mounted on said holder for movement thereon, second powered means connected to said leg clamp for moving the latter, clamp operating means connected to said leg clamp for opening and closing the latter, pressure sensitive controls on said holder and said clamp operating means for alternate automatic operation of both said powered means in response to respectively contacting the leg of an animal, and second control means connected to said clamp operating means and both said powered means for reversing the actions thereof to release said leg clamp from the leg of the animal.

3. An automatically operable device for restraining the legs of an animal, comprising a leg clamp holder disposed in a floor plane for laternal movement in said plane, a leg clamp mounted on said holder for movement thereon in a direction angled to said lateral movement, powered means connected to said holder and said leg clamp for moving both of the latter, clamp operating means connected to said leg clamp for opening and closing the latter, and pressure sensitive controls on said holder and said clamp operating means for alternate automatic operation of said powered means in response to respectively contacting the leg of an animal.

4. An automatically operable device for restraining the legs of an animal, comprising a leg clamp holder disposed in a floor plane for laternal movement in said plane, a leg clamp mounted on said holder for movement thereon in a direction angled to said lateral movement, powered means connected to said holder and said leg clamp for moving both of the latter, clamp operating means connected to said leg clamp for opening and closing the latter, pressure sensitive controls on said holder and said clamp operating means for alternate automatic operation of said powered means in response to respectively contacting the legs of an animal, and switch means connected to said powered means for forward and reverse energizing of the latter.

5. An automatically operable device for restraining the legs of an animal, comprising a leg clamp holder disposed in a floor plane for lateral movement in said plane, first powered means connected to said holder for moving the latter, control means connected to said first powered means for energizing the latter, a leg clamp mounted on said holder for movement therealong, second powered means connected to said leg clamp for moving the latter, clamp operating means connected to said leg clamp for opening and closing the latter, controls connected to both said powered means and said clamp operating means, and pressure sensitive switches on said holder and said clamp operating means and connected to said controls for alternate automatic oepration of both said powered means in response to respectively contacting the leg of an animal.

6. An automatically operable device for restraining the legs of an animal, comprising a platform, a leg clamp holder movable in a first direction on said platform, first powered means connected to said holder for moving the latter, first control means connected to said first powered means for energizing the latter, a leg clamp mounted on said holder for movement thereon, second powered means connected to said leg clamp for moving the latter, clamp operating means connected to said leg clamp for opening and closing the latter, pressure sensitive controls on said holder and said clamp operating means for alternate automatic operation of both said powered means in response to respectively contacting the leg of an animal, second control means connected to said clamp operating means and both said powered means for reversing the actions thereof to release said leg clamp from the leg of the animal, and means supporting said platform for raising and lowering the latter.

References Cited in the file of this patent

UNITED STATES PATENTS

| | | |
|---|---|---|
| 1,501,772 | Harford | July 15, 1924 |
| 1,786,375 | Watson | Dec. 23, 1930 |

FOREIGN PATENTS

| | | |
|---|---|---|
| 25,686 | Australia | Nov. 4, 1936 |